US010408276B2

(12) United States Patent
Eska

(10) Patent No.: US 10,408,276 B2
(45) Date of Patent: Sep. 10, 2019

(54) ARTICULATED SHAFT HAVING AN AXIAL SECURING MEANS

(71) Applicant: Dr. Ing. h.c. F. Porsche Aktiengesellschaft, Stuttgart (DE)

(72) Inventor: Paul Eska, Stuttgart (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 251 days.

(21) Appl. No.: 15/679,802

(22) Filed: Aug. 17, 2017

(65) Prior Publication Data
US 2018/0058509 A1    Mar. 1, 2018

(30) Foreign Application Priority Data
Aug. 30, 2016 (DE) .................. 10 2016 116 149

(51) Int. Cl.
| F16D 3/84 | (2006.01) |
| F16C 35/063 | (2006.01) |
| F16C 35/073 | (2006.01) |
| F16D 1/076 | (2006.01) |
| F16D 3/224 | (2011.01) |
| F16D 3/205 | (2006.01) |
| F16D 3/223 | (2011.01) |

(52) U.S. Cl.
CPC ............ *F16D 3/845* (2013.01); *F16C 35/063* (2013.01); *F16C 35/073* (2013.01); *F16D 1/076* (2013.01); *F16D 3/2055* (2013.01); *F16D 3/224* (2013.01); *F16D 2003/2232* (2013.01); *F16D 2003/22326* (2013.01)

(58) Field of Classification Search
CPC ........ F16D 1/076; F16D 3/2055; F16D 3/224; F16D 3/845; F16C 35/063; F16C 35/073
See application file for complete search history.

(56) References Cited

U.S. PATENT DOCUMENTS

| 3,540,232 A * | 11/1970 | Breuer .................... F16D 3/226 464/146 |
| 4,582,502 A * | 4/1986 | Girguis ................. F16D 3/2055 464/111 |
| 6,183,370 B1 * | 2/2001 | Lim ......................... F16D 3/06 464/133 |
| 7,252,616 B2 * | 8/2007 | Wormsbaecher ...... B60K 17/22 464/145 |
| 9,494,198 B2 * | 11/2016 | Nicholas ................. F16D 3/841 |

(Continued)

FOREIGN PATENT DOCUMENTS

| DE | 102007015413 A1 * | 10/2008 | ........... F16D 3/2055 |
| DE | 102011052459 A1 | 2/2013 | |

*Primary Examiner* — Jonathan P Masinick
(74) *Attorney, Agent, or Firm* — RatnerPrestia

(57) ABSTRACT

The articulated shaft has an axial securing means which includes a securing ring which has a spring prestress and acts on the articulated shaft via a connecting device of the articulated shaft to a housing cover of a joint housing. It is provided, in particular, that the housing cover is made of aluminum, on which a bearing disk made from steel lies which supports the prestressed securing ring on the outer side. This arrangement avoids it being possible for the securing ring to bury itself into the housing cover made from aluminum and a greater play being produced and the axial securing action no longer being ensured.

6 Claims, 1 Drawing Sheet

(56) References Cited

U.S. PATENT DOCUMENTS

Figure 1:
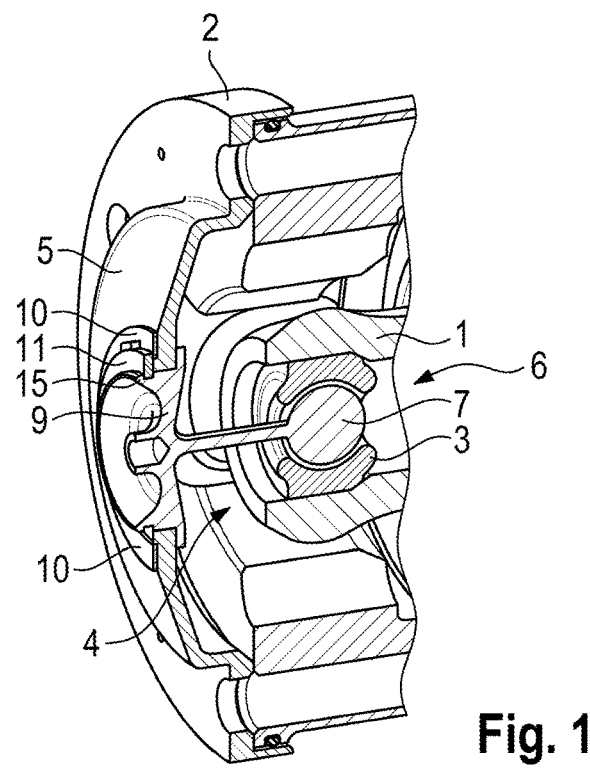

| | | | |
|---|---|---|---|
| 2004/0080131 A1* | 4/2004 | Pankl | B60K 17/22 280/93.511 |
| 2013/0040741 A1* | 2/2013 | Hurmer | F16D 3/20 464/97 |
| 2019/0178300 A1* | 6/2019 | Dubiel | F16D 3/845 |

* cited by examiner

ARTICULATED SHAFT HAVING AN AXIAL SECURING MEANS

CROSS-REFERENCE TO RELATED APPLICATIONS

This application claims priority to German Patent Application No. DE 10 2016 116 149.7, filed Aug. 30, 2016, the contents of such application being incorporated by reference herein in their entirety.

FIELD OF THE INVENTION

The invention relates to an articulated shaft having an axial securing means for a motor vehicle.

BACKGROUND OF THE INVENTION

DE 10 2011 052 459 A1, which is incorporated by reference herein, has disclosed a joint arrangement having a joint housing, in which an articulated shaft is held via a bearing, which articulated shaft is connected via a connecting device to the joint housing. An axial securing means of the articulated shaft is effected via a securing disk. Furthermore, an axial securing means of an articulated shaft is known from U.S. Pat. No. 6,183,370 B1, which is incorporated by reference herein, by means of an expanding ring.

SUMMARY OF THE INVENTION

Described herein is an axial securing means for an articulated shaft in a motor vehicle, which axial securing means ensures a space-saving solution without play and avoids damage of a housing cover of a joint housing by way of a securing ring.

The advantages which may be achieved by way of the invention consist in that the axial securing means for the articulated shaft is fixed by means of an axial prestress, which is achieved by it being provided in accordance with the preamble that the articulated shaft is arranged in a joint housing via a bearing, and that the housing is connected to the articulated shaft by means of a connecting device, and the device comprises a joint element which is held in the articulated shaft, with a supporting disk which is clamped into an end-side housing cover.

It is provided according to aspects of the invention that the housing cover consists of aluminum, on which an inner bearing disk made from steel lies, on which disk an outer securing ring is supported with an axial prestress, and that the bearing disk and the securing ring are held in a stationary manner in the supporting disk of the connecting device.

This arrangement of the steel bearing disk on the aluminum housing cover avoids a situation where the axially prestressed securing ring is buried into the aluminum housing cover and becomes damaged and/or the function of the securing ring with regard to the play is impaired.

Furthermore, it is provided in accordance with aspects of the invention that the housing cover has a central opening, in which the supporting disk of the connecting device of the articulated shaft is held such that it is clamped in via an integrated ring groove. The bearing disk is arranged in the ring groove of the supporting disk together with the prestressed securing ring, and the bearing disk and the securing ring are held such that they are clamped in fixedly between the housing cover and an outer annular web of the ring groove. Said clamped-in arrangement of the bearing disk together with the securing ring ensures an axial securing action of the articulated shaft with an axial prestress without play. In accordance with the invention, a contribution is also made to this by the fact that the resiliently prestressed securing ring is arranged between the annular web of the ring groove in the supporting disk of the connecting device and the housing cover, which securing ring forms the play-free axial securing means for the articulated shaft.

In particular, the prestressed securing ring can consist of a spring element with an axial prestress, which spring element permits a connection between the articulated shaft and the joint housing, which connection is resistant to tensile and compressive forces.

BRIEF DESCRIPTION OF THE DRAWING FIGURES

One exemplary embodiment of the invention is shown in the drawings and will be described in greater detail in the following text.

Figure 2:
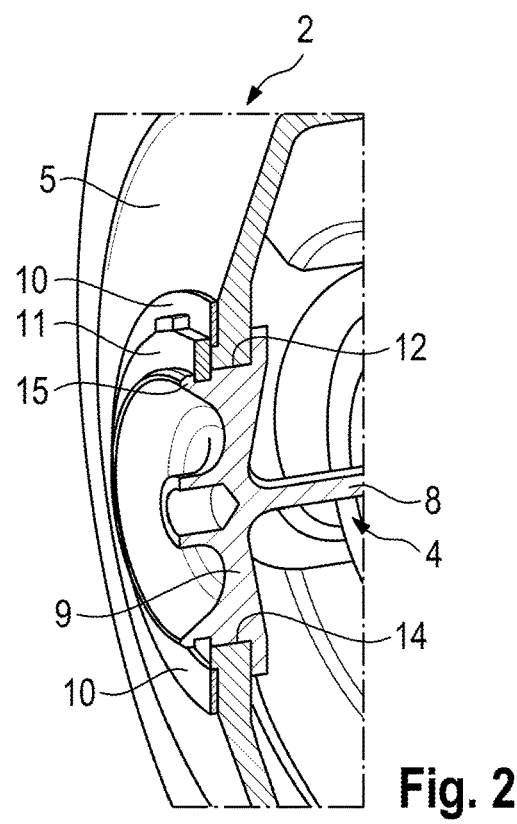

In the drawings:

FIG. 1 shows a section through an articulated shaft which is held in a joint housing via a bearing, with an axial securing means and a connecting device between the articulated shaft and the joint housing, and FIG. 2 shows an enlarged illustration of the axial securing means for the articulated shaft, in accordance with FIG. 1.

DETAILED DESCRIPTION OF THE INVENTION

An articulated shaft 1 for a motor vehicle is held in a joint housing 2 by means of a bearing 3 and is connected to a housing cover 5 via a connecting device 4. The connecting device 4 comprises substantially a joint element 6 which is held in the articulated shaft 1, which joint element 6 preferably consists of a ball head 7 which is connected on the end side via a rod-shaped region 8 to a supporting disk 9 which is held in the housing cover 5 of the joint housing 2.

The housing cover 5 consists of aluminum, on which an inner bearing disk 10 made from steel lies. An outer securing ring 11 which is provided with an axial prestress is supported on said inner bearing disk 10. Said securing ring 11 is held with the bearing disk 10 in a stationary manner in the supporting disk 5 of the connecting device 4.

The housing cover 5 has a central opening 14, in which the supporting disk 9 of the connecting device 4 of the articulated shaft 1 is held such that it is clamped in fixedly via an integrated ring groove 12. The bearing disk 10 is arranged in said ring groove 12 together with the prestressed securing ring 11 in such a way that the bearing disk 10 and the securing ring 11 are clamped in between the housing cover 5 and an outer annular web 15 of the ring groove 12 (FIG. 2). The securing ring 11 is arranged in a resiliently prestressed manner between the annular web 15 of the ring groove 12 of the supporting disk 9 and the housing cover 5, and forms a play-free axial securing means for the articulated shaft 1. Said securing ring 11 can consist of a spring element which forms a connection between the articulated shaft 1 and the joint housing 2, which connection is resistant to tensile and compressive forces.

What is claimed is:

1. An articulated shaft having an axial securing means for a motor vehicle, which articulated shaft is arranged in a joint housing via a bearing, wherein the housing is connected to the articulated shaft by a connecting device, and the device comprises a joint element which is held in the articulated shaft, with a supporting disk which is clamped into an end-side housing cover, wherein an inner bearing disk lies on the end-side housing, on which an outer securing ring is supported with an axial prestress, and wherein the bearing disk and the outer securing ring are held in a stationary manner in the supporting disk of the connecting device.

2. The articulated shaft as claimed in claim 1, wherein the housing cover has a central opening, in which the supporting disk of the connecting device of the articulated shaft is held such that the supporting disk is clamped via an integrated ring groove.

3. The articulated shaft as claimed in claim 2, wherein the supporting disk and the inner bearing disk are arranged in the integrated ring groove together with the outer securing ring, and the bearing disk and the outer securing ring are held such that they are clamped in a stationary manner between the housing cover and an outer annular web of the integrated ring groove.

4. The articulated shaft as claimed in claim 2, wherein the outer securing ring is arranged in a resiliently prestressed manner between the annular web of the integrated ring groove in the supporting disk of the connecting device and the housing cover, and forms a play-free axial securing device for the articulated shaft.

5. The articulated shaft as claimed in claim 2, wherein the outer securing ring comprises a spring element with an axial prestress, which spring element permits a connection between the articulated shaft and the joint housing, which connection is resistant to tensile and compressive forces.

6. The articulated shaft as claimed in claim 1, wherein the end-side housing cover is composed of aluminum, and the inner bearing disk is composed of steel.

* * * * *